(12) United States Patent
Kobayashi et al.

(10) Patent No.: US 11,781,463 B2
(45) Date of Patent: Oct. 10, 2023

(54) WORK VEHICLE INCLUDING DPF

(71) Applicant: KUBOTA CORPORATION, Osaka (JP)

(72) Inventors: Satoshi Kobayashi, Suwanee, GA (US); Mark Breutzman, Hoschton, GA (US)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/589,348

(22) Filed: Jan. 31, 2022

(65) Prior Publication Data

US 2023/0243287 A1    Aug. 3, 2023

(51) Int. Cl.
| | |
|---|---|
| *F01N 9/00* | (2006.01) |
| *F01N 11/00* | (2006.01) |
| *F02D 41/02* | (2006.01) |
| *F01N 3/023* | (2006.01) |

(52) U.S. Cl.
CPC ............. *F01N 9/002* (2013.01); *F01N 3/023* (2013.01); *F01N 11/00* (2013.01); *F02D 41/029* (2013.01); *F01N 2900/1606* (2013.01); *F02D 2200/0812* (2013.01)

(58) Field of Classification Search
CPC .......... F01N 9/002; F01N 3/023; F01N 11/00; F01N 2900/1606; F02D 41/029; F02D 2200/0812
See application file for complete search history.

(56) References Cited

U.S. PATENT DOCUMENTS

| | | | | |
|---|---|---|---|---|
| 7,797,097 | B2* | 9/2010 | Kawamura | F02D 41/1466 60/285 |
| 8,758,464 | B2 | 6/2014 | Fujii et al. | |
| 9,631,530 | B2* | 4/2017 | Koike | F01N 3/023 |
| 2009/0198402 | A1* | 8/2009 | Quigley | F01N 3/0238 701/31.4 |
| 2010/0170227 | A1* | 7/2010 | Tsukada | E02F 9/0866 60/299 |
| 2013/0074481 | A1* | 3/2013 | Miura | F01N 9/002 60/311 |
| 2013/0110348 | A1* | 5/2013 | Jinbo | E02F 9/26 701/36 |
| 2013/0133315 | A1* | 5/2013 | Shibutani | F01N 9/002 60/311 |
| 2014/0019025 | A1* | 1/2014 | Shinomiya | F02D 41/029 701/101 |
| 2014/0156207 | A1* | 6/2014 | Aiello | F01N 9/007 702/34 |
| 2016/0186413 | A1* | 6/2016 | Tanaka | E02F 9/267 701/29.1 |

(Continued)

*Primary Examiner* — Matthew T Largi
(74) *Attorney, Agent, or Firm* — Greenblum & Bernstein, P.L.C.

(57) ABSTRACT

A work vehicle includes an exhaust gas treatment device including a DPF (diesel particulate filter); a DPF condition determiner configured to determine a DPF condition as a condition of the DPF based on a detection signal from a sensor; a monitor configured to display the DPF condition and having a DPF condition display area that includes a plurality of text segments to display respective predetermined text items different from each other; and a text display controller configured to light up two or more of the plurality of text segments in accordance with the DPF condition determined by the DPF condition determiner.

10 Claims, 12 Drawing Sheets

(56) References Cited

U.S. PATENT DOCUMENTS

| | | | |
|---|---|---|---|
| 2016/0258134 A1* | 9/2016 | Matsumoto | H04N 7/183 |
| 2019/0122562 A1* | 4/2019 | Kim | F01N 11/00 |
| 2019/0161081 A1* | 5/2019 | Ogura | B60W 30/14 |
| 2019/0350130 A1 | 11/2019 | Spitz et al. | |

* cited by examiner

Fig.10

Regeneration process 3:
Parked regeneration at PM level 3
in the automatic regeneration prohibited mode

31 Turn on automatic regeneration prohibited mode
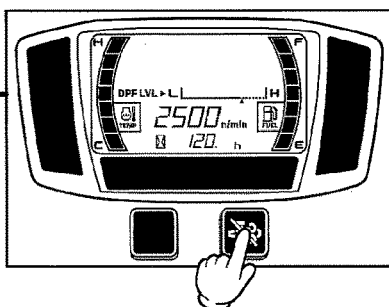

32 Accumulated PM amount increases

33 PM level 1 reached
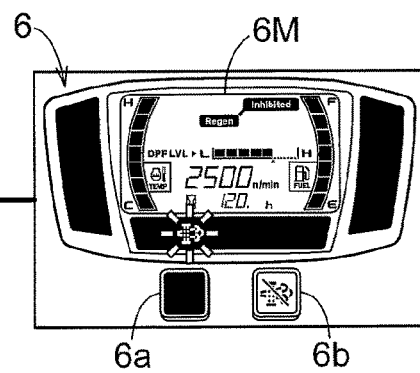

34 PM level 2 reached

35 Parked regeneration required
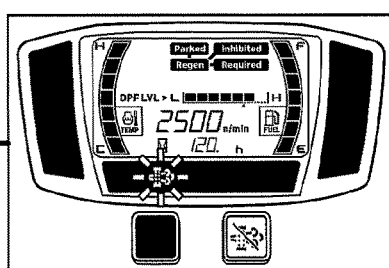

36 PM level 3 reached

37 Clear automatic regeneration prohibited mode
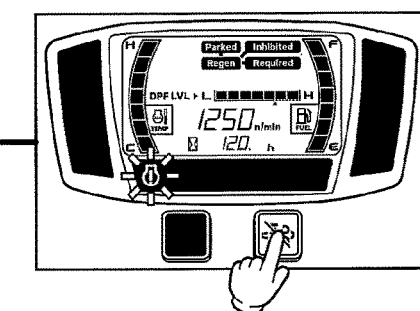

38 Parked regeneration required
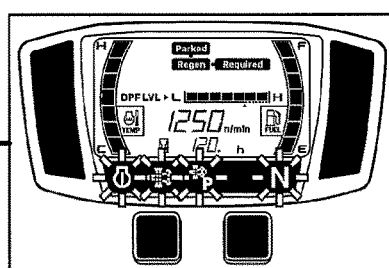

39 Have mower ready for parked regeneration and park mower
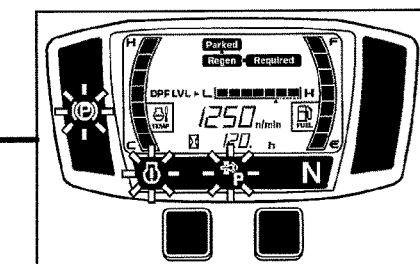

40 Start parked regeneration
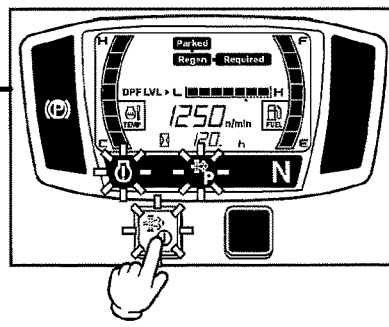

41 Parked regeneration completed

End

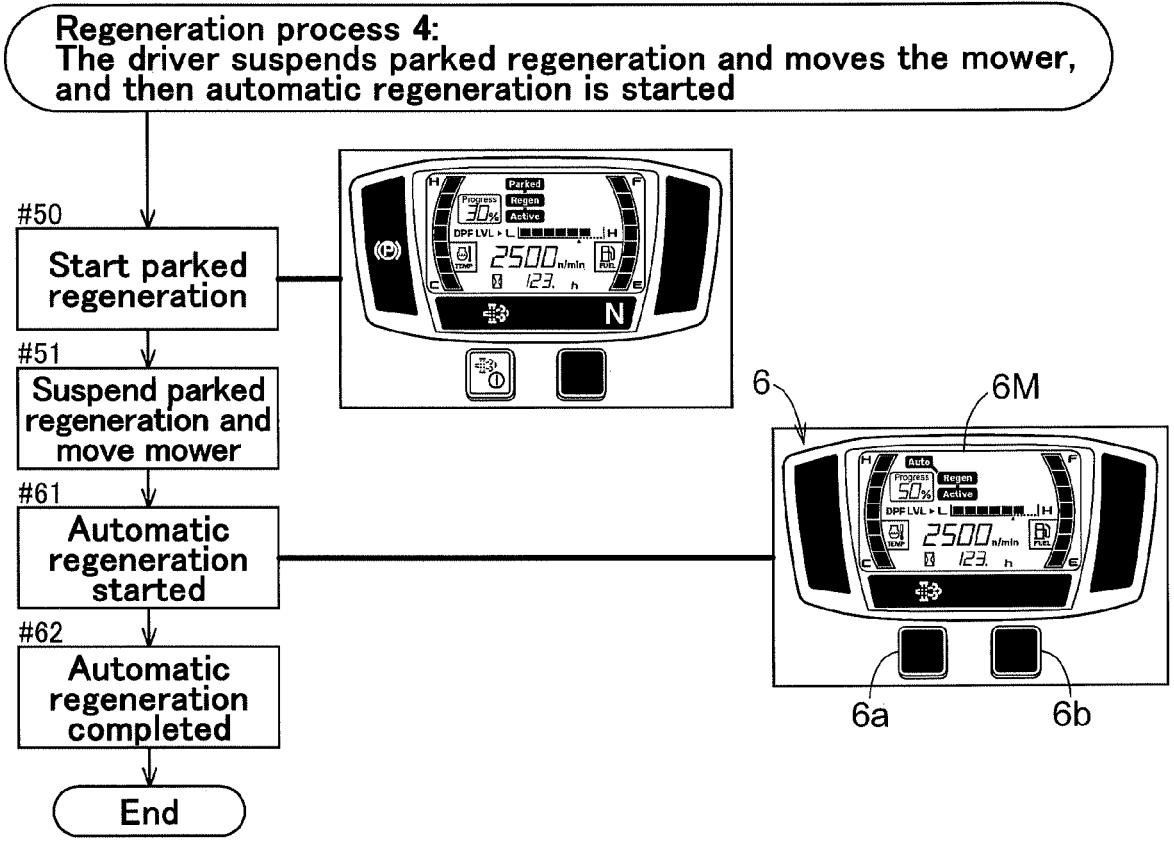

WORK VEHICLE INCLUDING DPF

TECHNICAL FIELD

The present invention relates to a work vehicle including a DPF (diesel particulate filter) and a monitor.

BACKGROUND ART

A diesel-engine vehicle may include a DPF and a DPF regeneration controller as an exhaust gas treatment device. The DPF regeneration controller performs an automatic DPF regeneration process if an estimated amount of PM (particulate matter) accumulated on the DPF has reached a predetermined value. The regeneration process heats exhaust gas flowing through the DPF to incinerate the PM on the DPF for removal.

U.S. Pat. No. 8,758,464 discloses an exhaust gas treatment device configured to become prohibited from performing an automatic DPF regeneration process in response to the driver selecting such prohibition with use of a selection device even if a prerequisite for an automatic DPF regeneration process is satisfied. The exhaust gas treatment device starts performing an automatic DPF regeneration process in response to the driver switching from the prohibition to permission of an automatic DPF regeneration process with use of the selection device. This arrangement allows the driver to decide at will when to start a regeneration process.

U.S. patent application publication No. 2019/0350130 discloses a work vehicle including a display unit configured to display data on a detection result as a result of processing detection signals from a group of sensors. The display unit has a first display area to display temporally changing data, a second display area to display safety data related to safety check, and a third display area to display warning data.

SUMMARY OF INVENTION

The exhaust gas treatment device disclosed in U.S. Pat. No. 8,758,464 may unfortunately not allow the driver to select an appropriate time to start a regeneration process. Further, the work vehicle disclosed in U.S. patent application publication No. 2019/0350130 is not configured to display information on the condition of a DPF.

The above circumstances have led to a demand for a work vehicle configured to cause a monitor to display information that appropriately assists the driver to perform operations related to a DPF regeneration.

In order to attain the above object, a work vehicle according to the present invention includes: an exhaust gas treatment device including a DPF; a DPF condition determiner configured to determine a DPF condition as a condition of the DPF based on a detection signal from a sensor; a monitor configured to display the DPF condition and having a DPF condition display area that includes a plurality of text segments to display respective predetermined text items different from each other; and a text display controller configured to light up two or more of the plurality of text segments in accordance with the DPF condition determined by the DPF condition determiner.

The monitor configured to display the DPF condition has a DPF condition display area including a plurality of text segments. The text segments are configured to show respective predetermined text items different from each other. The text display controller is configured to light up text segments to indicate the DPF condition determined by the DPF condition determiner. This allows the driver to receive information on the DPF condition, for example, information related to DPF regeneration, through the illuminating text segments.

The text display controller lights up and turns off each text segment by turning on and off a light emitter such as an LED for illuminating the text segment. The monitor may alternatively include a liquid crystal display (LCD) for the text segments. The monitor may further alternatively include self-luminous elements for the text segments.

A preferred embodiment of the present invention is arranged such that the DPF condition display area includes a link segment between mutually adjacent text segments of the plurality of text segments, and the text display controller lights up the link segment in response to the mutually adjacent text segments being lit up. The driver receives an easily understandable message by seeing a link between (i) a text segment indicative of information related to the DPF condition and (ii) another text segment indicative of other information related to the DPF condition. For instance, the driver is able to clearly become aware of the type of DPF regeneration required or being performed by seeing in a small area a link between (i) a text segment indicative of a type of DPF regeneration and (ii) a text segment indicative of whether the DPF regeneration is required or being performed.

Performing DPF regeneration influences how the driver is able to drive the work vehicle. It will be convenient for the driver if the driver is notified of the progress of the DPF regeneration. A preferred embodiment of the present invention is thus further arranged such that the monitor has a regeneration progress display area to indicate a progress of regeneration of the DPF.

If the amount of PM accumulated on the DPF has increased to a certain level, the work vehicle requires DPF regeneration. The driver will naturally like to know the accumulated PM amount. A preferred embodiment of the present invention is thus further arranged such that the monitor has an accumulated PM amount display area to display an estimated amount of particulate matter accumulated on the DPF.

The driver needs to be aware of not only the DPF condition but also various states of the work vehicle. The driver would, however, feel inconvenience in driving the work vehicle if the DPF condition were displayed away from where states of the work vehicle are displayed. This is because the driver would need to shift their focus repeatedly over a long distance. A preferred embodiment of the present invention is thus further arranged such that the monitor has, below the DPF condition display area, a first operation state display area to display a first operation state of the work vehicle. This arrangement allows the driver to become aware of the DPF condition and operation states of the work vehicle while hardly shifting their focus.

The DPF condition display area and the first operation state display area should, in a case where the two display areas are close to each other, preferably be separated from each other distinctly for an easy-to-see display. A preferred embodiment of the present invention is thus further arranged such that the accumulated PM amount display area extends in a left-right direction to display the estimated amount of particulate matter accumulated on the DPF in a form of a bar extending in the left-right direction, and the accumulated PM amount display area is between the DPF condition display area and the first operation state display area. With this arrangement, the accumulated PM amount is indicated in the form of a bar extending in the left-right direction and separating the DPF condition display area and the first operation state display area from each other. This allows the driver to easily discriminate the DPF condition display area and the first operation state display area from each other.

Considering that the work vehicle may have many operation states to be indicated, it will be convenient if the monitor has a plurality of operation state display areas. A preferred embodiment of the present invention is thus further arranged such that the monitor has, leftward of the DPF condition display area, a second operation state display area to display a second operation state of the work vehicle and, rightward of the DPF condition display area, a third operation state display area to display a third operation state of the work vehicle. The monitor, which has a plurality of operation state display areas, is capable of not only displaying more operation states of the work vehicle, but also grouping those operation states, thereby providing an easy-to-see display for the driver.

A DPF regeneration process requires an operation by the driver. The driver will like to decide whether to perform such an operation, while the driver is aware of the DPF condition and operation states of the work vehicle. A preferred embodiment of the present invention is thus further arranged such that the monitor includes a plurality of indicators each of a user operation (that is, an operation by the driver or an assistant) related to regeneration of the DPF. This arrangement allows the driver to simultaneously become aware of the DPF condition, operation states of the work vehicle, and what user operation is required in relation to a regeneration process, thereby ensuring that the driver is able to decide appropriately, for example, when to perform an operation related to a regeneration process.

A preferred embodiment of the present invention is further arranged such that the plurality of indicators are each associated with the user operation such that the indicator is blinked to prompt the user operation and that the indicator remains on to indicate the user operation having been performed. An indicator blinking indicates that the driver is being required to perform a user operation associated with that indicator. An indicator remaining on indicates that the user operation associated with that indicator has been performed. This allows the monitor to clearly indicate that a user operation is being required or has been performed, contributing to reliable user operations.

The user operation related to DPF regeneration is inhibiting automatic regeneration, starting parked regeneration, increasing the rotation speed of the engine, or setting the transmission to neutral. Automatic regeneration refers to DPF regeneration performed automatically while the work vehicle is traveling. Parked regeneration refers to DPF regeneration performed while the work vehicle is parked. Increasing the rotation speed of the engine may precede DPF regeneration so that the engine has an increased rotation speed before the start of DPF regeneration. Setting the transmission to neutral is a prerequisite for parked regeneration, and is performed for the work vehicle to be parked. A preferred embodiment of the present invention is thus further arranged such that the user operation (which is associated with a corresponding indicator) includes at least one of inhibiting automatic regeneration of the DPF, starting parked regeneration of the DPF, increasing a rotation speed of an engine of the work vehicle, or setting a transmission of the work vehicle to neutral.

BRIEF DESCRIPTION OF DRAWINGS

FIG. 10 is a flowchart of still another example DPF regeneration process.
FIG. 11 is a flowchart of still another example DPF regeneration process.

DETAILED DESCRIPTION

Figure 1:
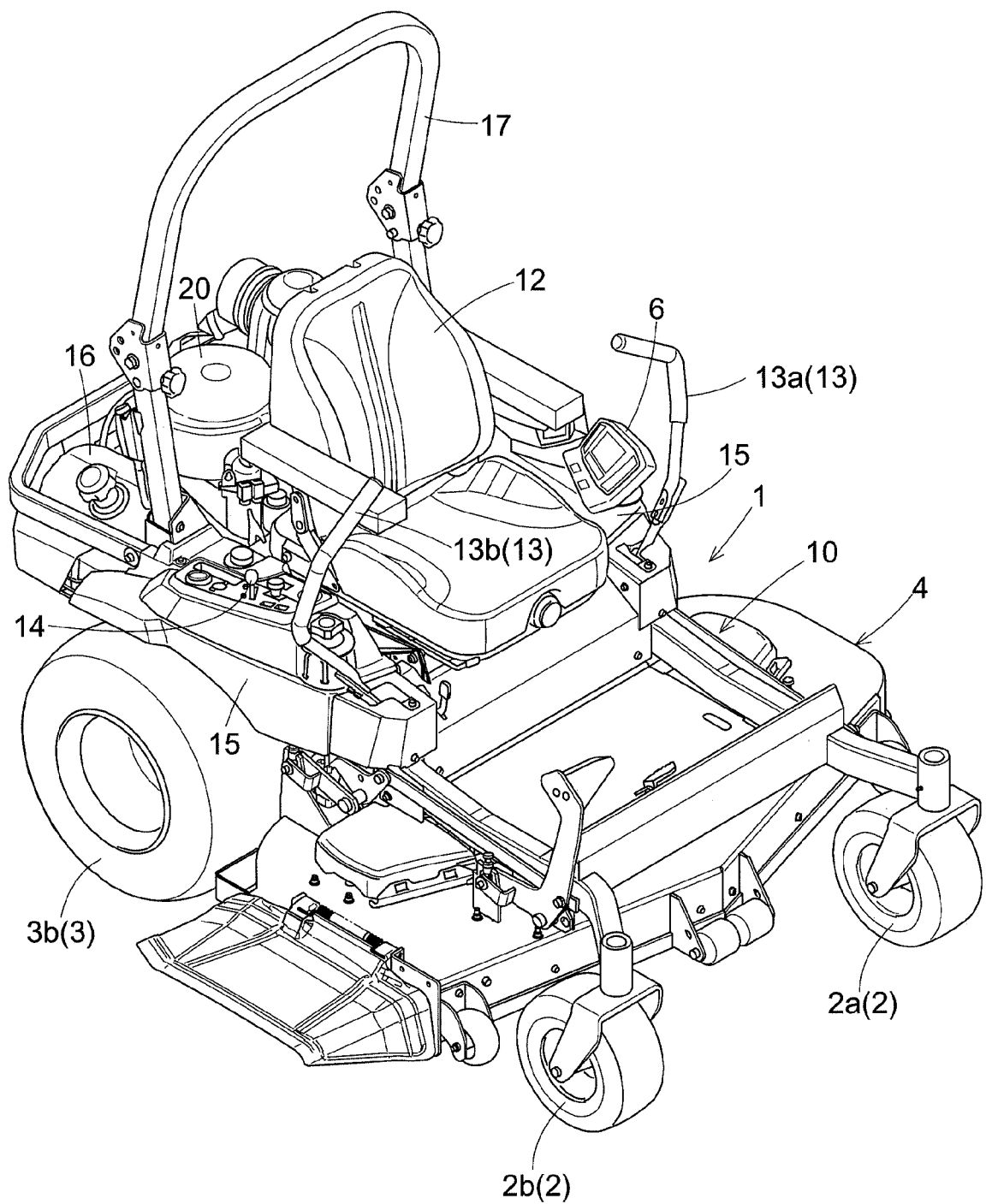
FIG. 1 is a perspective view of a mower.
Figure 2:
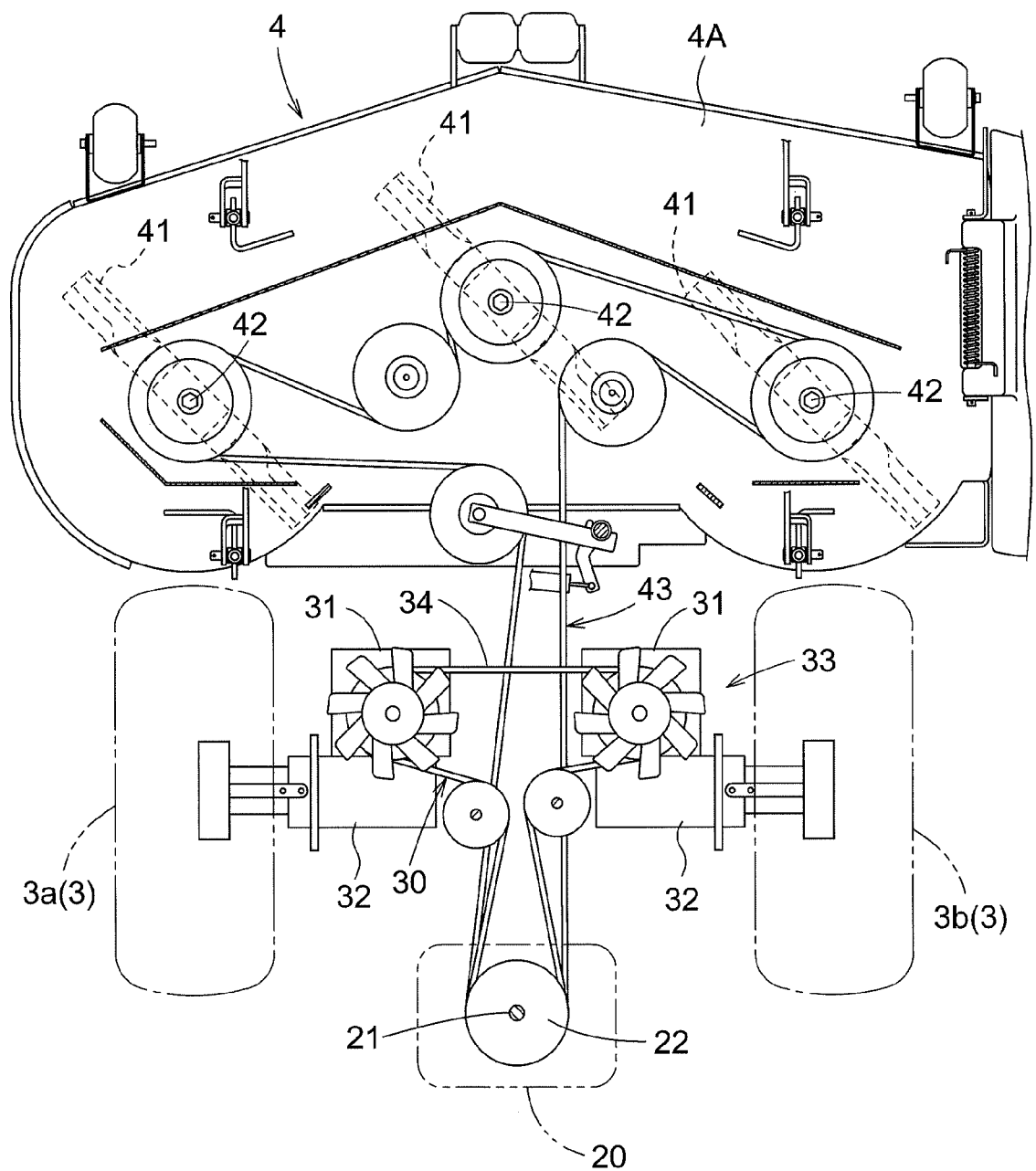
FIG. 2 is a diagram illustrating the power system of a mower.

The description below deals with a mower as an embodiment of the work vehicle of the present invention with reference to drawings. FIG. 1 is a perspective view of the mower. FIG. 2 is a diagram illustrating the power system of the mower. Unless otherwise stated, the present specification uses (i) terms such as "forward" to mean the forward direction in relation to the front-back direction (travel direction) of the body, (ii) terms such as "backward" to mean the backward direction in relation to the front-back direction (travel direction) of the body, (iii) terms such as "left-right direction" and "lateral direction" to mean the transverse direction (width direction) of the body, which is orthogonal to the front-back direction of the body, and (iv) terms such as "upward" and "downward" to refer to a position in the vertical direction of the body, that is, a height from the ground.

The mower includes a body 1, a front-wheel unit 2 in the form of a caster unit, and a rear-wheel unit 3 as a travel device. The body 1 is supported by the front-wheel unit 2 and the rear-wheel unit 3 on the ground. The mower is a so-called zero turn mower: the rear-wheel unit 3 includes a left rear wheel 3a and a right rear wheel 3b that are configured to rotate in the normal and reverse directions and that have independently controllable rotation speeds. The front-wheel unit 2 includes a left front wheel 2a and a right front wheel 2b. The body 1 includes, as a main component, a frame 10 including square pipes. The mower includes a mower unit 4 as an implement between the front-wheel unit 2 and the rear-wheel unit 3. The mower unit 4 is suspended from the frame 10 in such a manner as to be capable of being lifted and lowered.

The frame 10 extends in the front-back direction. The mower includes a driver's seat 12 on a central portion of the frame 10. The mower also includes, on a front upper surface of the frame 10, a floor plate for the driver to place their feet on.

The mower includes an engine 20 disposed on a back portion of the frame 10 and configured to supply rotation power to the rear-wheel unit 3 and the mower unit 4. The engine 20 runs on a fossil fuel such as heavy oil or gasoline.

The engine 20 includes an engine output shaft 21 (see FIG. 2) protruding downward. The mower includes a fuel tank 16 next to the engine 20.

The mower includes an arch-shaped ROPS (roll-over protective structure) 17 standing behind the driver's seat 12. The mower also includes fenders 15 to the left and right of the driver's seat 12. The mower includes, on the upper face of the right fender 15, user operation devices such as operation levers and operation buttons, for example, an accelerator lever 14 for use to change the rotation speed of the engine 20. The mower also includes a meter panel 6 attached to the upper face of the left fender 15 and facing the face of the driver in the driver's seat 12.

The mower includes a steering unit 13 including a left steering lever 13a to the left of the driver's seat 12 and a right steering lever 13b to the right of the driver's seat 12. The left steering lever 13a is for use to adjust the rotation speed of the left rear wheel 3a, whereas the right steering lever 13b is for use to adjust the rotation speed of the right rear wheel 3b. The left steering lever 13a and the right steering lever 13b are each swingable to a forward-travel speed change section, a neutral position, and a backward-travel speed change section.

As schematically illustrated in FIG. 2, the mower includes a power transmission system including a travel power transmission mechanism 30 and a PTO (power take-off) mechanism 40. The travel power transmission mechanism 30 is configured to transmit power from the engine 20 to the rear-wheel unit 3. The PTO mechanism 40 is configured to transmit power from the engine 20 to the mower unit 4. The engine 20 includes two output pulleys 22 attached respectively to an upper and lower portions of the engine output shaft 21 and configured to output power from the engine 20.

The travel power transmission mechanism 30 includes a pair of left and right HSTs (hydrostatic transmissions) 31, a pair of left and right gear-based power transmission mechanisms 32, and a travel belt-based power transmission mechanism 33. The travel belt-based power transmission mechanism 33 is configured to transmit power from the output pulleys 22 to the HSTs 31 through a travel belt 34. The gear-based power transmission mechanisms 32 are configured to transmit power as varied by the HSTs 31 to the rear-wheel unit 3 (namely, the left rear wheel 3a and the right rear wheel 3b).

The left and right HSTs 31 are configured to vary power on the basis of control signals generated in response to a swing of the left steering lever 13a and the right steering lever 13b, respectively. The user (driver) can operate the left steering lever 13a and the right steering lever 13b substantially linearly in the front-back direction of the body so that the rear-wheel unit 3 is in any one of a stop state, a straight travel state, a gentle turn state, a pivot turn state, and a spin turn state. The left steering lever 13a and the right steering lever 13b are each movable on a speed change operation path along the front-back direction of the body as well as on a stop operation path extending outward in the transverse direction of the body from a substantially central portion (which is also the zero speed position for the corresponding HST 31) of the speed change operation path. Each stop operation path has an outer end, which corresponds to the stop position (also referred to "neutral position"). Moving the left steering lever 13a and the right steering lever 13b to the respective neutral positions sets the left and right HSTs 31 into the neutral state, and allows the body 1 to stop. In the straight travel state, the left rear wheel 3a and the right rear wheel 3b are driven to rotate in the normal or reverse direction at an equal speed. In the gentle turn state, the left rear wheel 3a and the right rear wheel 3b are driven to rotate in the normal or reverse direction at respective speeds different from each other. In the pivot turn state, one of the left rear wheel 3a and the right rear wheel 3b is stopped, whereas the other is driven to rotate in the normal or reverse direction. In the spin turn state, one of the left rear wheel 3a and the right rear wheel 3b is driven to rotate in the normal direction, whereas the other is driven to rotate in the reverse direction. Moving the left steering lever 13a and the right steering lever 13b to the neutral position sets the left and right HSTs 31 into the neutral state.

The mower unit 4 includes a mower deck 4A including a top plate and a side plate. The mower unit 4 includes, inside the mower deck 4A, three blades 41 arranged in the transverse direction of the body 1, as indicated with dotted lines in FIG. 2. The mower unit 4 also includes three drive shafts 42 each held at the top plate of the mower deck 4A with use of a bearing. The blades 41 are each fixed to the corresponding one of the drive shafts 42. The PTO mechanism 43, which includes a belt, is configured to transmit power from the output pulleys 22 of the engine 20 to each of the drive shafts 42.

Figure 3:
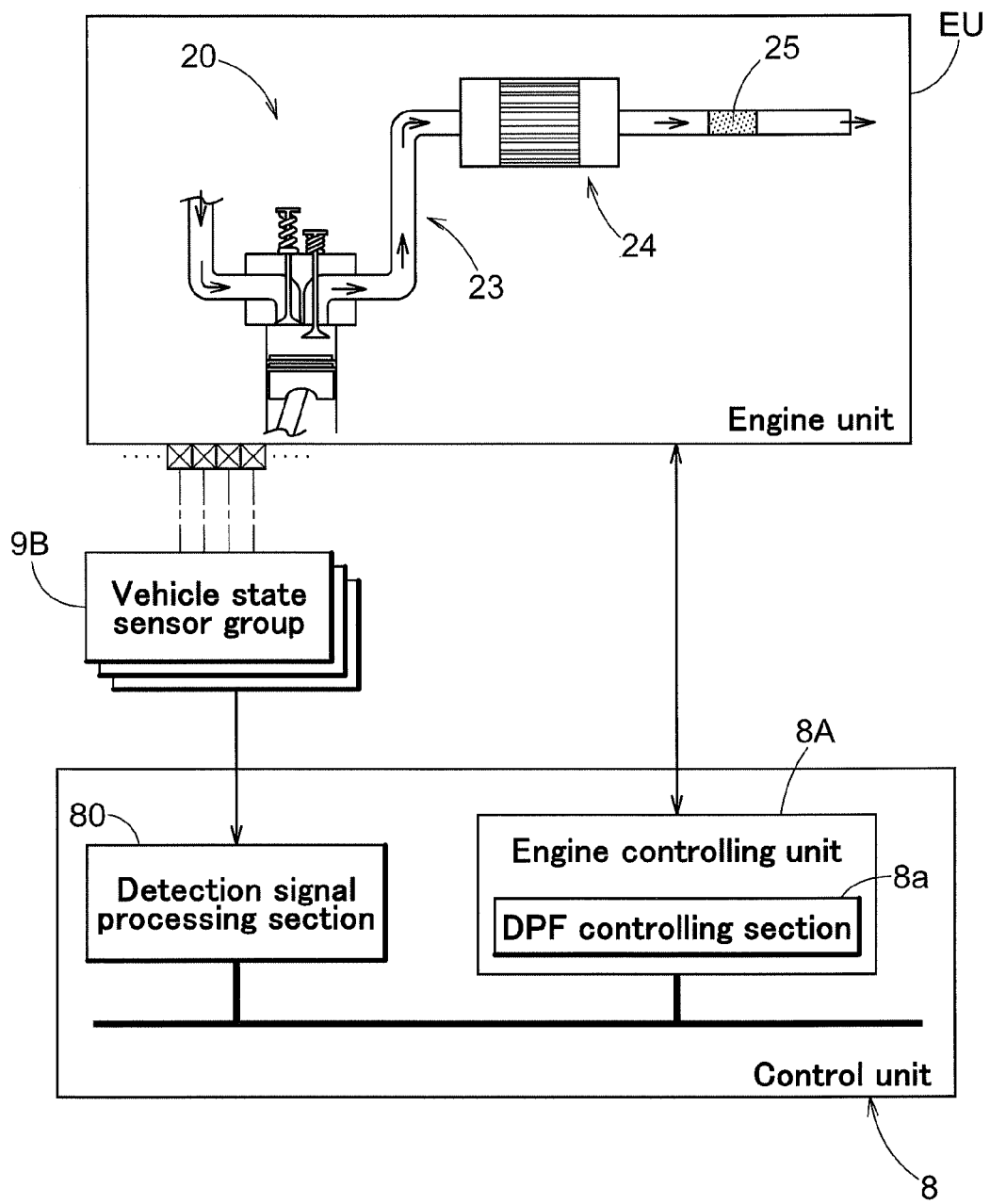
FIG. 3 is a diagram illustrating an engine unit including a DPF.

As illustrated in FIG. 3, the engine 20, which is a diesel engine, is a main component of an engine unit EU. The engine unit EU also includes an exhaust pipe unit 23 configured to discharge exhaust gas from the engine 20, a DPF (diesel particulate filter) 24 serving as an exhaust gas cleaning device, and a SCR (selective catalytic reduction) unit 25. The DPF 24 is configured to collect PM (particulate matter) in exhaust gas. The DPF 24 receives, at the front end, exhaust gas flowing from the engine 20 into the DPF 24, and lets treated exhaust gas be discharged from the back end. The exhaust gas from the DPF 24 flows through the SCR unit 25, which is configured to blow a urea solution toward the exhaust gas to remove nitrogen oxides and clean the exhaust gas.

The DPF 24 accumulates PM as the mower travels over time. When an estimated amount of accumulated PM (accumulated PM amount: DPF LVL) has reached a predetermined value, the engine DPF controlling section 8a needs to perform a filter regeneration process, that is, a process of combusting particulate matter for removal. The mower includes a vehicle state sensor group 9B including a group of sensors configured to detect the state of the engine 20 and a group of sensors configured to detect the condition of the DPF 24.

The mower includes a control unit 8 including an engine controlling unit 8A. The engine unit EU is controlled by the engine controlling unit 8A on the basis of a control command from the control unit 8. The engine controlling unit 8A includes a DPF controlling section 8a configured to control the DPF 24 in terms of, for example, a process of regenerating the DPF 24 (hereinafter referred to simply as "DPF regeneration").

The present embodiment is arranged such that the DPF regeneration controlled by the DPF controlling section 8a is either automatic regeneration or manual regeneration. Basically, automatic regeneration is performed while the mower is traveling, whereas manual regeneration is performed while the mower is parked. Manual regeneration is thus practically parked regeneration. The present embodiment rates the accumulated PM amount (DPF LVL) in seven classes, namely classes 1 to 7, in ascending order of the accumulated PM amount. For a DPF controlling process, classes 1 to 5 are associated with PM level 1 (hereinafter referred to as "level 1"), class 6 is associated with PM level 2 (hereinafter referred to as "level 2"), and class 7 is associated with PM level 3 (hereinafter referred to as "level 3"). Automatic regeneration is practically regeneration that is performed automatically when the accumulated PM amount has reached level 1. The driver is allowed to prohibit automatic regeneration. Parked regeneration is regeneration that is not performed autonomously, but is performed in response to an operation by the driver. The mower requires the driver to start parked regeneration when the accumulated PM amount has reached level 2, which is higher than level 1, and level 3, which is even higher than level 2. The driver is able to start parked regeneration at level 1 as well. Parked regeneration is strongly required at level 2 or higher: the mower sends out a warning (for example, horn sound) to prompt the driver to start parked regeneration. The mower is programmed to allow automatic regeneration to be started at level 1 and level 2, but prohibit automatic regeneration from being started at level 3.

Figure 4:
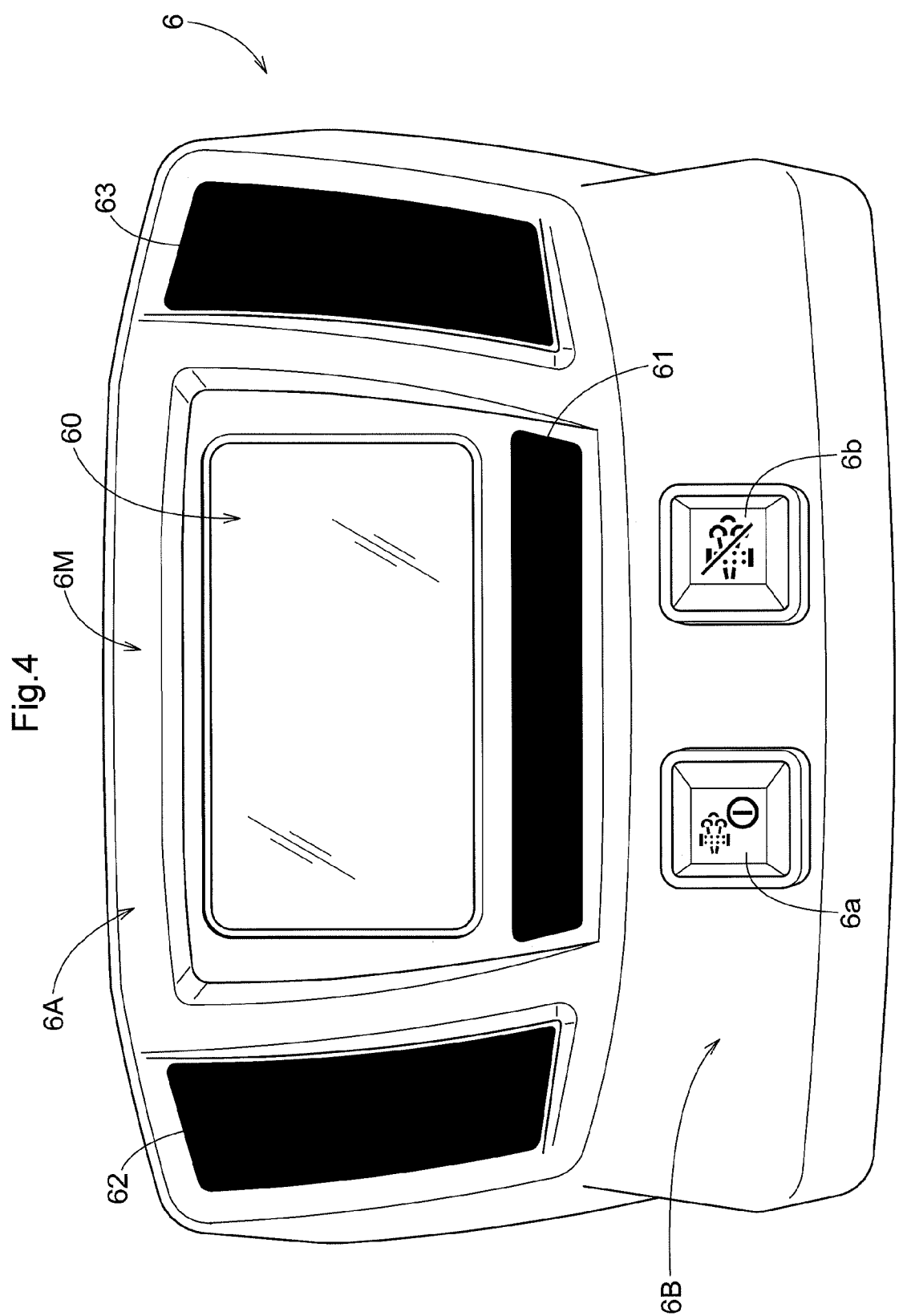
FIG. 4 is a front view of a meter panel included in a mower.

FIG. 4 illustrates a meter panel 6 configured to notify the driver of, for example, the state of the operation of the mower and the DPF condition. The meter panel 6 has a display area 6A and an operation area 6B. The meter panel 6 includes a manual regeneration button 6a and a regeneration prohibiting button 6b in the operation area 6B. The manual regeneration button 6a is for the driver to press to start DPF regeneration at will. Pressing the regeneration prohibiting button 6b once sets the mower into an automatic regeneration prohibited mode (that is, turns on the automatic regeneration prohibited mode). Pressing the regeneration prohibiting button 6b again clears the automatic regeneration prohibited mode (that is, turns off the automatic regeneration prohibited mode) and sets the mower into an automatic regeneration permitted mode. Removing the main key turns off the automatic regeneration prohibited mode; the automatic regeneration prohibited mode is off by default.

Figure 5:
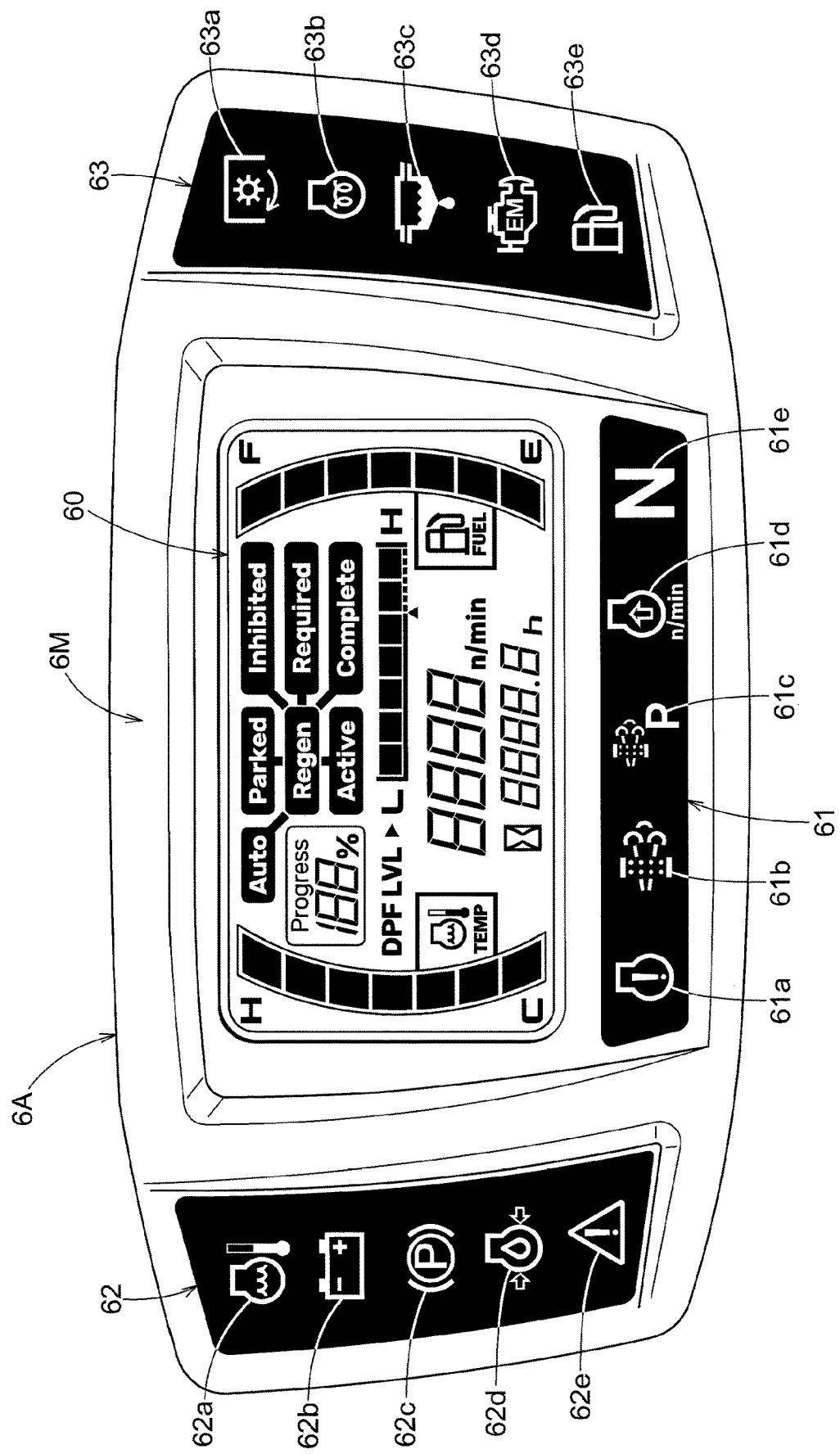
FIG. 5 is a front view of a monitor included in a meter panel.

As illustrated in FIGS. 4 and 5, the meter panel 6 includes a monitor 6M in the display area 6A. The monitor 6M has an LCD (liquid crystal display) area 60, a first LED (light-emitting diode) area 61, a second LED area 62, and a third LED area 63. The first LED area 61 includes a row of five signs arranged next to one another and each configured to blink or remain on with use of an LED. This row of signs includes an engine warning sign 61a, a regeneration requiring sign (manual regeneration sign) 61b, a parked regeneration sign 61c, an engine rotation increase sign 61d, and a neutral sign 61e. The second LED area 62 includes a column of five signs arranged on top of one another and each configured to blink or remain on with use of an LED. This column of signs includes a water temperature warning sign 62a, a charge sign 62b, a parking brake sign 62c, an engine oil pressure sign 62d, and a master caution sign 62e. The third LED area 63 includes a column of five signs arranged on top of one another and each configured to blink or remain on with use of an LED. This column of signs includes a PTO sign 63a, an air heater sign 63b, a separator sign 63c, an EM warning sign 63d, and a fuel sign 63e.

The row of signs in the first LED area 61 is mainly a group of indicators of user operations related to a DPF regeneration process. The indicators are each associated with a user operation (that is, an operation by the driver). The engine warning sign 61a blinking, for example, is meant to prompt the driver to check the engine 20. The regeneration requiring sign 61b blinking is meant to prompt the driver to start manual regeneration. The parked regeneration sign 61c blinking is meant to prompt the driver to start manual regeneration. The engine rotation increase sign 61d blinking is meant to prompt the driver to perform an operation to increase the rotation speed of the engine 20. The neutral sign 61e blinking is meant to prompt the driver to perform an operation to set the HSTs 31 into the neutral state. The parked regeneration sign 61c and the neutral sign 61e remaining on indicates that their respective prompted actions have been performed. An increase in the rotation speed of the engine 20 turns off the engine rotation increase sign 61d.

Figure 6:
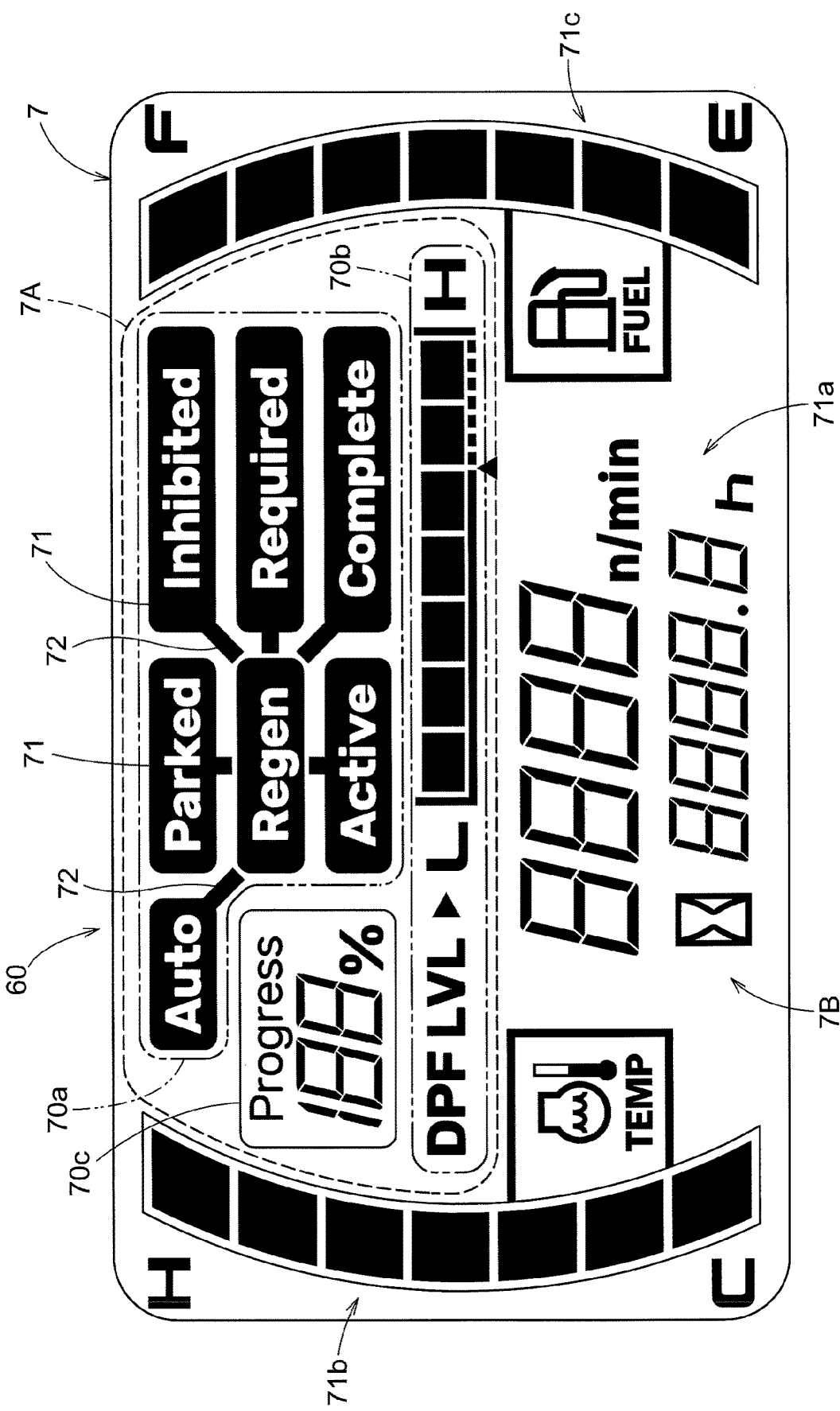
FIG. 6 is a diagram illustrating a main screen of a monitor.

As illustrated in FIG. 6, the meter panel 6 includes an LCD unit 7 in the LCD area 60. As indicated with dotted lines, the LCD unit 7 has (i) a DPF condition display area 7A to display the DPF condition, which is information on the DPF 24, and (ii) an operation state display area 7B to display the state of the operation of the mower.

The DPF condition display area 7A has a segment display area 70a and an accumulated PM amount display area 70b as indicated with double-dashed chain lines as well as a regeneration progress display area 70c as indicated with a solid line. The segment display area 70a includes a plurality of text segments 71 and a plurality of link segments 72.

The text segments 71 are configured to show respective predetermined text items different from one another. The text segments 71, in other words, have a text display function. The link segments 72 are each between two mutually adjacent text segments 71 to link the respective text items of the two text segments 71. The LCD unit 7 is configured to light up the text segments 71 and the link segments 72 (by means of liquid crystal backlighting for the present embodiment) to send a clear message to the driver.

The present embodiment includes seven text segments 71: "Auto", "Parked", "Regen", "Active", "Inhibited", "Required", and "Complete". For instance, lighting up "Auto", "Regen", and "Active" and the link segments 72 between the three text segments 71 allows the driver to easily receive the message "auto regen active". Similarly, lighting up "Parked", "Regen", and "Required" and the link segments 72 between them allows the driver to easily receive the message "parked regen required".

The LCD unit 7 is configured to display in the accumulated PM amount display area 70b an estimated amount of PM accumulated on the DPF. The accumulated PM amount display area 70b is substantially at the center of the LCD unit 7 and extends in the left-right direction. The accumulated PM amount display area 70b is under the segment display area 70a and the regeneration progress display area 70c. The LCD unit 7 is configured to display in the accumulated PM amount display area 70b an estimated amount of accumulated PM in the form of a bar. The bar includes seven rectangular segments arranged next to one another. The first to fourth segments from the left each indicate level 0; the fifth segment indicates level 1; the sixth segment indicates level 2, and the seventh segment indicates level 3. The LCD unit 7 is configured to display "L" at the left end of the bar and "H" at the right end of the bar. The LCD unit 7 is configured to display in the regeneration progress display area 70c a percentage indicative of the progress of the DPF regeneration process being performed.

The operation state display area 7B has a first operation state display area 71a, a second operation state display area 71b, and a third operation state display area 71c. The first operation state display area 71a is under the accumulated PM amount display area 70b. The LCD unit 7 is configured to display in the first operation state display area 71a a digital tachometer and a digital hour meter indicative respectively of the rotation speed of the engine 20 and the operation hours both as a first operation state of the mower. The accumulated PM amount display area 70b is positioned and shaped to help visually separate the display of the state of the operation of the mower from the display of the DPF condition, contributing to the easy-to-see display of the LCD unit 7.

The second operation state display area 71b is at the left end of the LCD unit 7. The second operation state display area 71b includes a curved segment bar that functions as an engine cooling water temperature meter indicative of the temperature of cooling water for the engine 20 as a second operation state of the mower. The third operation state display area 71c is at the right end of the LCD unit 7. The third operation state display area 71c includes a curved segment bar that functions as a remaining fuel amount meter indicative of the amount of remaining fuel as a third operation state of the mower.

Figure 7:
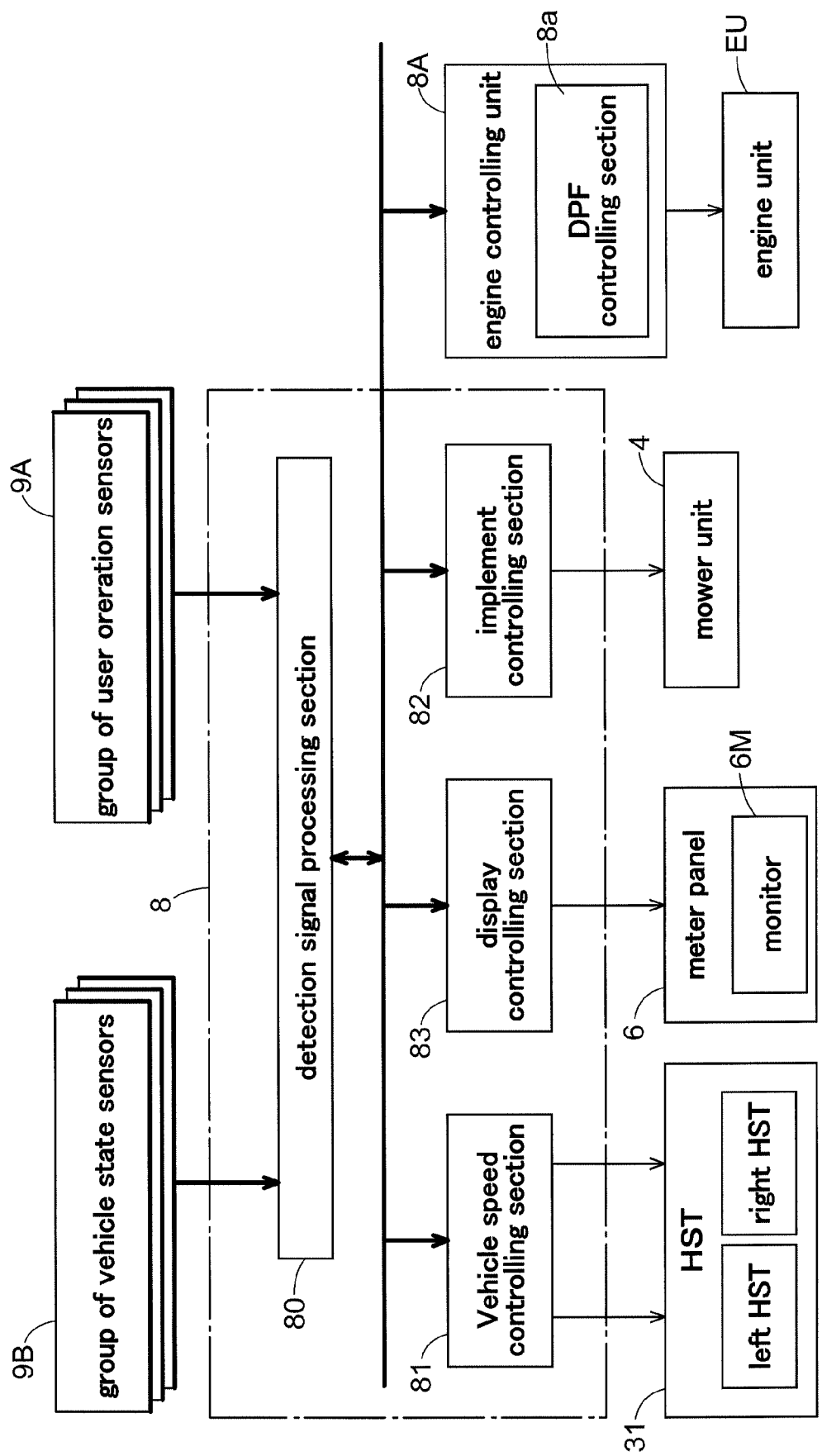
FIG. 7 is a functional block diagram of the control system of a mower.

FIG. 7 is a functional block diagram illustrating the control system of the mower. The functional blocks in FIG. 7 are merely for the purpose of description: two or more of the functional blocks may be combined into a single functional block; a single functional block may be divided into two or more separate functional blocks; and one or more new functional blocks may be added.

The control system includes a control unit 8 and an engine controlling unit 8A as main units. The two units are each practically a computer system, and are connected to each other over an in-vehicle LAN. The control unit 8 includes a detection signal processing section 80 configured to process detection signals from sensors at different positions on the body 1 and output data on the detection result. The sensors are divided into a user operation sensor group 9A practically configured to detect user operations and a vehicle state sensor group 9B configured to detect vehicle states.

The user operation sensor group 9A includes steering lever sensors and parking sensors. The steering lever sensors are configured to detect the respective positions of the left steering lever 13a and the right steering lever 13b, each of which is swingable to different positions including the neutral position. The parking sensors are configured to detect the state of the operation of a parking brake operating tool (not illustrated in the drawings). The user operation sensor group 9A also includes the above-described manual regeneration button 6a and regeneration prohibiting button 6b.

The vehicle state sensor group 9B includes a vehicle speed sensor configured to detect the vehicle speed, an engine rotation speed sensor configured to detect the rotation speed of the engine 20, a fuel sensor configured to detect the amount of remaining fuel, an oil pressure sensor configured to detect the oil pressure, and a water temperature sensor configured to detect the temperature of cooling water.

The control unit 8 is connected to, for example, the meter panel 6, the engine unit EU, and the pair of left and right HSTs 31. The engine controlling unit 8A is configured to adjust the rotation speed of the engine 20 on the basis of a control signal from the control unit 8. The mower unit 4 includes a tension clutch pulley including a clutch solenoid, which is configured to activate and deactivate the tension clutch pulley on the basis of a control signal from the control unit 8. The HSTs 31 each include an adjustment motor (not illustrated in the drawings), which is configured to adjust the angle of the swash plate of the corresponding HST 31 on the basis of a control signal from the control unit 8 to change the vehicle speed.

The engine controlling unit 8A is configured to control the rotation speed of the engine 20 on the basis of a control signal from the control unit 8 as well as detection signals from the user operation sensor group 9A and the vehicle state sensor group 9B and. The engine controlling unit 8A is also configured to provide the control unit 8 with (i) information on the engine 20 including information on the amount of fuel that the engine 20 is receiving and the load on the engine 20 and (ii) information on the DPF regeneration process.

The control unit 8 includes various functional sections each configured to compute data on a detection result outputted by the detection signal processing section 80 and generate data and signals intended to operate various devices included in the mower. As such functional sections, FIG. 7 shows a vehicle speed controlling section 81, an implement controlling section 82, and a display controlling section 83.

The vehicle speed controlling section 81 is configured to (i) generate a control command related to the vehicle speed (including a neutral command) on the basis of the position to which each of the left steering lever 13a and the right steering lever 13b has been moved and (ii) transmit the control command to the corresponding HST 31. Specifically, the vehicle speed controlling section 81 generates a control signal on the basis of the position to which the left steering lever 13a has been moved, and transmits the control signal to the HST 31 for the left rear wheel 3a. This adjusts the angle of the swash plate of that HST 31, thereby causing the left rear wheel 3a to rotate at a speed based on the user operation. Similarly, the vehicle speed controlling section 81 generates a control signal on the basis of the position to which the right steering lever 13b has been moved, and transmits the control signal to the HST 31 for the right rear wheel 3b. This adjusts the angle of the swash plate of that HST 31, thereby causing the right rear wheel 3b to rotate at a speed based on the user operation.

The implement controlling section 82 is configured to control the operation of the mower unit 4.

The display controlling section 83 is configured to control the display by the meter panel 6 on the basis of, for example, detection signals from the user operation sensor group 9A and the vehicle state sensor group 9B, a control signal from the DPF controlling section 8a, and/or an operation signal from the meter panel 6.

The description below deals with different flows of the process of regenerating the DPF 24 with reference to FIGS. 8 to 11, which also schematically illustrate example displays of the meter panel 6 in some steps.

Figure 8:
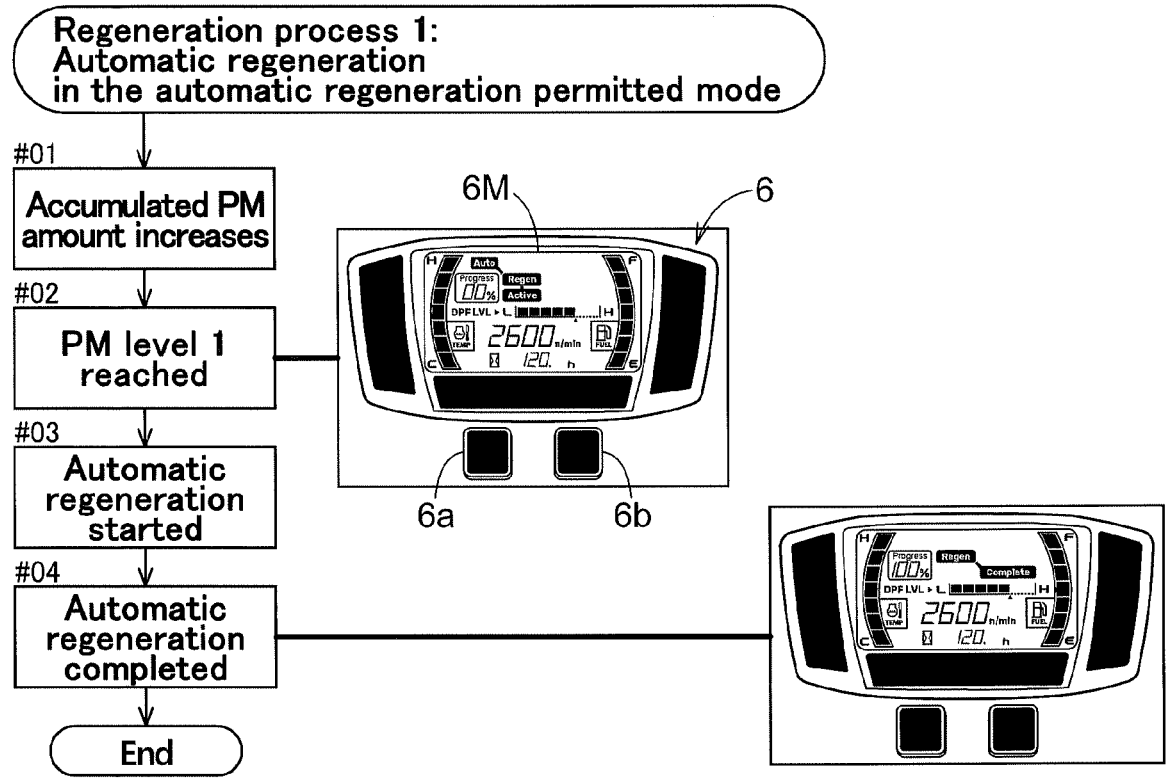
FIG. 8 is a flowchart of an example DPF regeneration process.

FIG. 8 is a flowchart of automatic regeneration in the automatic regeneration permitted mode (regeneration process 1). The accumulated PM amount increases as the engine unit EU operates (#01). When the accumulated PM amount has reached level 1 (#02), the DPF controlling section 8a automatically starts DPF regeneration (automatic regeneration) (#03). The meter panel 6 lights up the "Auto", "Regen", and "Active" text segments 71 on the monitor 6M to notify the driver of the automatic regeneration being performed. The progress of the DPF regeneration is indicated by an increase of the numerical value in the regeneration progress display area 70c. When the degree of the progress of the regeneration has reached a predetermined value, the automatic regeneration becomes completed, at which time the meter panel 6 turns off the "Auto" and "Active" text segments 71, lights up "Complete", and shows "100%" for the progress of the regeneration in the regeneration progress display area 70c to notify the driver of the completion of the regeneration process (#04). The meter panel 6 turns off the illuminating text segments 71 several seconds (for example, five seconds) later, and changes "100%" for the progress of the regeneration in the regeneration progress display area 70c to "0%" to indicate that the accumulated PM amount is zero. The meter panel 6 temporarily shows "100%" for the progress of the regeneration to allow the driver to become aware of the time point of the completion of the automatic regeneration.

Figure 9:
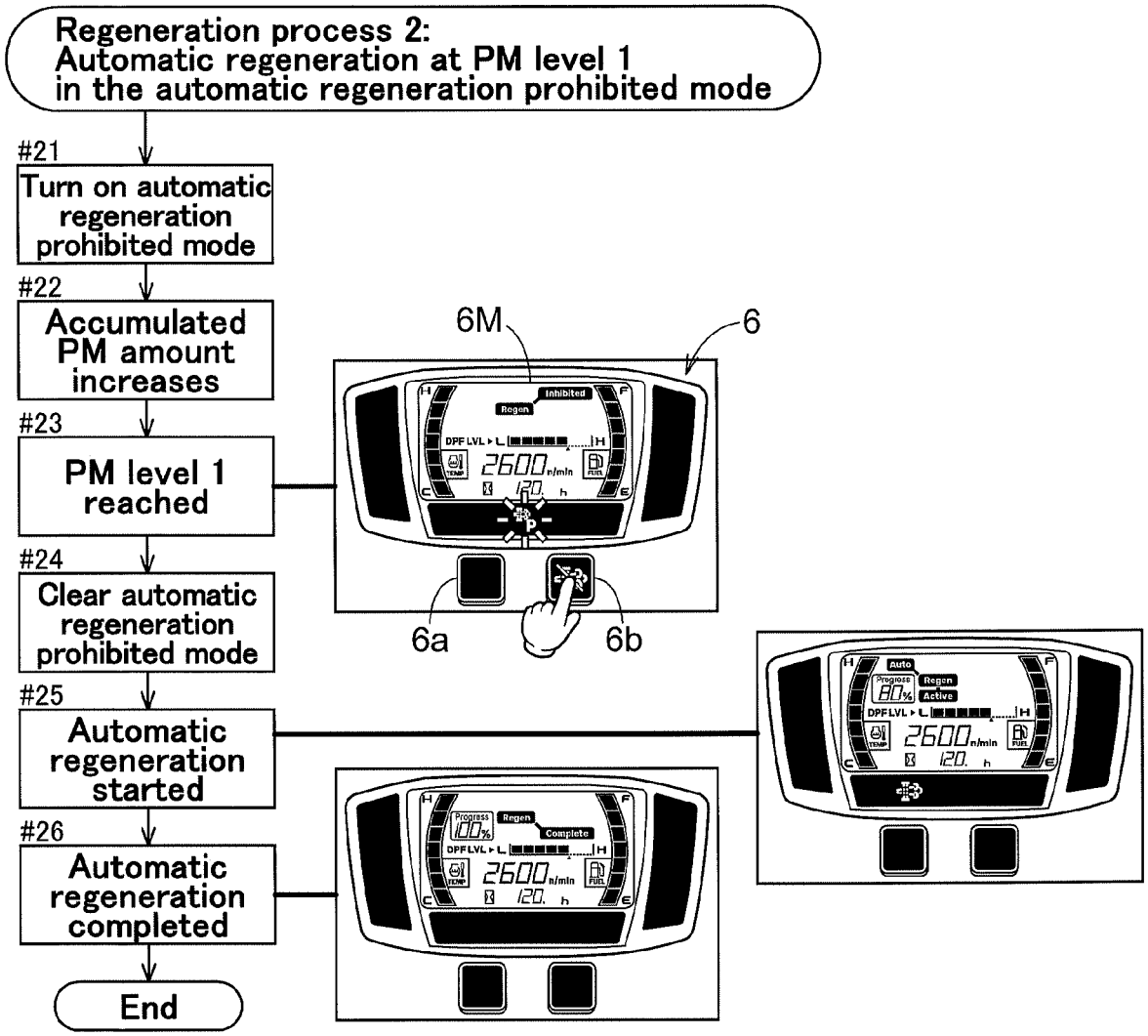
FIG. 9 is a flowchart of another example DPF regeneration process.

FIG. 9 is a flowchart of automatic regeneration started after the driver clears the automatic regeneration prohibited mode (regeneration process 2). Pressing the regeneration prohibiting button 6b sets the mower into the automatic regeneration prohibited mode (#21). The meter panel 6 lights up the corresponding text segments 71 to notify the driver that the mower is in the automatic regeneration prohibited mode. The accumulated PM amount increases as the engine unit EU operates (#22). When the accumulated PM amount has reached level 1 (#23), the meter panel 6 starts to blink the regeneration requiring sign 61b or the parked regeneration sign 61c to prompt the driver to start a regeneration process. The driver pressing the regeneration prohibiting button 6b clears the automatic regeneration prohibited mode and sets the mower into the automatic regeneration permitted mode (#24). This automatically starts DPF regeneration (#25). When the degree of the progress of the regeneration has reached a predetermined value, the automatic regeneration becomes completed, at which time, similarly to regeneration process 1 in FIG. 8, the meter panel 6 lights up the "Regen" and "Complete" text segments 71 and shows "100%" for the progress of the regeneration in the regeneration progress display area 70c to notify the driver of the completion of the regeneration process (#26). The meter panel 6 turns off the illuminating text segments 71 several seconds (for example, five seconds) later, and changes "100%" for the progress of the regeneration in the regeneration progress display area 70c to "0%" to indicate that the accumulated PM amount is zero. The meter panel 6 temporarily shows "100%" for the progress of the regeneration to allow the driver to become aware of the time point of the completion of the automatic regeneration.

FIG. 10 is a flowchart of parked regeneration in the automatic regeneration prohibited mode (regeneration process 3). Pressing the regeneration prohibiting button 6b sets the mower into the automatic regeneration prohibited mode (#31). The meter panel 6 lights up the corresponding text segments 71 to notify the driver that the mower is in the automatic regeneration prohibited mode. The accumulated PM amount increases as the engine unit EU operates (#32). When the accumulated PM amount has reached level 1 (#33), the meter panel 6 starts to blink the regeneration requiring sign 61b to prompt the driver to start a regeneration process. When the accumulated PM amount has increased further to reach level 2 (#34), the meter panel 6 starts to blink the regeneration requiring sign 61b or the parked regeneration sign 61c to prompt the driver to start a regeneration process (#35). When the accumulated PM amount has increased even further to reach level 3 (#36), the driver needs to press the regeneration prohibiting button 6b to clear the automatic regeneration prohibited mode (#37). The meter panel 6 then starts to blink the engine warning sign 61a, the regeneration requiring sign (manual regeneration sign) 61b, the parked regeneration sign 61c, and the neutral sign 61e to prompt the driver to start a process of parked regeneration (#38). The driver moving the left steering lever 13a and the right steering lever 13b into the above-mentioned neutral positions allows the body 1 to stop, and also causes the neutral sign 61e to stop blinking and remain on. The meter panel 6 then starts to blink the parking brake sign 62c to prompt the driver to activate the parking brake (#39). The activation of the parking brake is a prerequisite for parked regeneration. In response to the prerequisite becoming satisfied, the meter panel 6 starts to blink the manual regeneration button 6a. The driver pressing the manual regeneration button 6a starts parked regeneration (#40). When the parked regeneration has become completed, the meter panel 6 lights up the "Regen" and "Complete" text segments 71 to notify the driver of the completion of the regeneration process (#41). The meter panel 6 turns off the illuminating text segments 71 several seconds later.

FIG. 11 is a flowchart of a process including parked regeneration that is suspended for the body 1 to move and automatic regeneration that is started thereafter (regeneration process 4). The flowchart starts with a step of starting parked regeneration (#50). The meter panel 6 illuminates the manual regeneration button 6a, blinks the regeneration requiring sign 61b and the neutral sign 61e, and lights up the "Parked", "Regen", and "Active" text segments 71.

If the driver deactivates the parking brake and moves the left steering lever 13a or the right steering lever 13b off the neutral position to, for example, park the mower at a different location, the mower suspends the parked regeneration, and allows the driver to move the mower (#51). While the parked regeneration is suspended, the DPF controlling section 8a starts automatic regeneration if prerequisites for automatic regeneration are satisfied, specifically, if (i) the parking brake is deactivated, (ii) the left steering lever 13a or the right steering lever 13b is off the neutral position, (iii) the accumulated PM amount is level 2 or lower, and (iv) the engine 20 is rotating at a sufficient speed (#61). If, for instance, the rotation speed of the engine 20 is insufficient, the DPF controlling section 8a will not start automatic regeneration. The meter panel 6 thus blinks the engine rotation increase sign 61d to prompt the driver to increase the rotation speed of the engine 20. In this state, the DPF controlling section 8a will allow the driver to start parked regeneration if the driver moves the left steering lever 13a and the right steering lever 13b to the respective neutral positions and activates the parking brake instead of increasing the rotation speed of the engine 20. If the automatic regeneration started in step #61 progresses without trouble and becomes completed, the meter panel 6 shows the same information as in step #04 in FIG. 8 (#62). If the rotation speed of the engine 20 has decreased during the automatic regeneration, the DPF controlling section 8a will stop the automatic regeneration, and the meter panel 6 will show information to prompt the driver to start parked regeneration.

Figure 12:
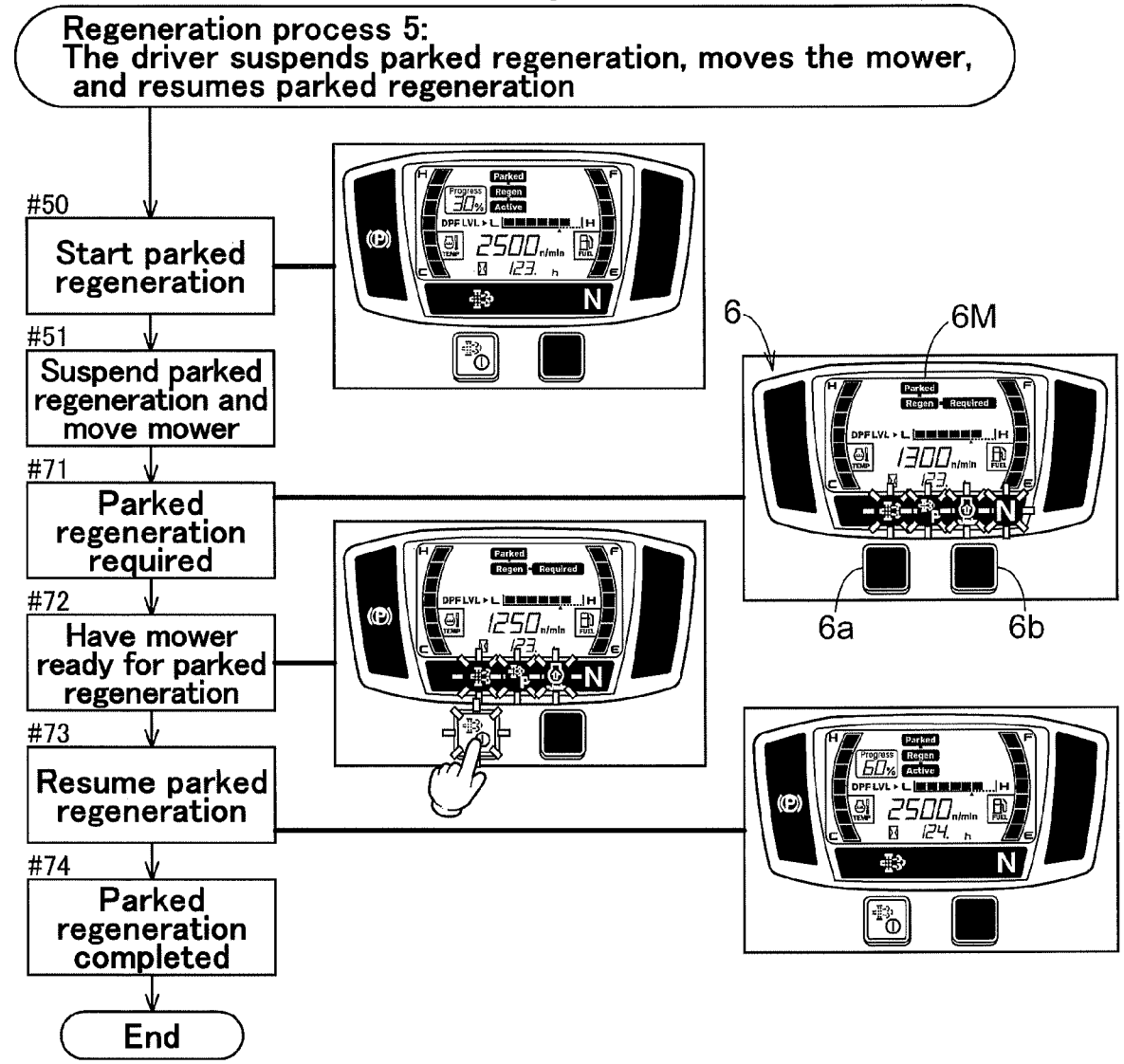
FIG. 12 is a flowchart of still another example DPF regeneration process.

FIG. 12 is a flowchart of a process including parked regeneration that is suspended for the body 1 to move and that is resumed thereafter (regeneration process 5). The flowchart starts with a step of starting parked regeneration (#50), as in the flowchart in FIG. 11. The meter panel 6 illuminates the manual regeneration button 6a, blinks the regeneration requiring sign 61b and the neutral sign 61e, and lights up the "Parked", "Regen", and "Active" text segments 71.

The parked regeneration is suspended, for instance, for the driver to park the mower at a different location. The suspension allows the driver to move the mower (#51). If the engine 20 is rotating at a speed insufficient for automatic regeneration at the time of the suspension of the parked regeneration, the meter panel 6 stops illuminating the manual regeneration button 6a, blinks the regeneration requiring sign 61b, the parked regeneration sign 61c, the engine rotation increase sign 61d, and the neutral sign 61e, and lights up the "Parked", "Regen", and "Required" text segments 71 to prompt the driver to start parked regeneration (#71). At this stage, the driver performs preparatory operations for parked regeneration if the accumulated PM amount is level 3 (in which case the mower requires parked regeneration), or if the driver opts to have the parked regeneration resumed while the accumulated PM amount is level 2 or lower (#72). As the preparatory operations, the driver moves the left steering lever 13*a* and the right steering lever 13*b* to the respective neutral positions, operates the accelerator lever 14 to decrease the rotation speed of the engine 20 to a level appropriate for parked regeneration if the rotation speed is excessively high, and activates the parking brake to park the body 1. Then, the driver pressing the manual regeneration button 6*a* resumes the parked regeneration (#73). Once the parked regeneration has become completed, the meter panel 6 turns off the illuminating text segments 71 several seconds later (#74).

The embodiment described above includes LEDs and an LCD as display elements for the separate areas of the meter panel 6. The present invention is, however, not limited to such an arrangement: it may alternatively include an incandescent bulb or a phosphorescent material as at least one of the display elements.

The embodiment described above is a mower as the work vehicle of the present invention. The present invention is also applicable to various other work vehicles such as tractors, snowplow vehicles, liquid spraying vehicles, and construction machines.

The arrangements disclosed for the above embodiments (including the alternative embodiments; hereinafter the same applies) may each be combined with an arrangement disclosed for another embodiment, as long as such a combination does not cause a contradiction. Further, the embodiments disclosed in the present specification are mere examples. The present invention is not limited to those embodiments, and may be altered as appropriate, as long as such an alteration does not result in a failure to attain an object of the present invention.

The invention claimed is:

1. A work vehicle, comprising:
   an exhaust gas treatment device including a DPF (diesel particulate filter);
   a DPF condition determiner, provided in an electronic control unit, configured to determine a DPF condition as a condition of the DPF based on a detection signal from a sensor;
   a monitor configured to display the DPF condition and having a DPF condition display area that includes a plurality of text segments to display respective predetermined text items different from each other; and
   a text display controller, provided in the electronic control unit, configured to light up two or more of the plurality of text segments in accordance with the DPF condition determined by the DPF condition determiner, wherein the DPF condition display area includes a link segment between mutually adjacent text segments of the plurality of text segments, and the text display controller lights up the link segment in response to the mutually adjacent text segments being lit up.

2. The work vehicle according to claim 1, wherein the monitor includes a plurality of indicators each of a user operation related to regeneration of the DPF.

3. The work vehicle according to claim 2, wherein the plurality of indicators are each associated with the user operation such that the indicator is blinked to prompt the user operation and that the indicator remains on to indicate the user operation having been performed.

4. The work vehicle according to claim 3, wherein the user operation includes at least one of inhibiting automatic regeneration of the DPF, starting parked regeneration of the DPF, increasing a rotation speed of an engine of the work vehicle, or setting a transmission of the work vehicle to neutral.

5. The work vehicle according to claim 1, wherein the text display controller lights up the two or more of the plurality of text segments by turning on a light emitter.

6. The work vehicle according to claim 1, wherein the monitor has a regeneration progress display area to indicate a progress of regeneration of the DPF.

7. The work vehicle according to claim 1, wherein the monitor has an accumulated PM amount display area to display an estimated amount of particulate matter accumulated on the DPF.

8. The work vehicle according to claim 7, wherein the monitor has, below the DPF condition display area, a first operation state display area to display a first operation state of the work vehicle.

9. The work vehicle according to claim 8, wherein the accumulated PM amount display area extends in a left-right direction to display the estimated amount of particulate matter accumulated on the DPF in a form of a bar extending in the left-right direction, and the accumulated PM amount display area is between the DPF condition display area and the first operation state display area.

10. The work vehicle according to claim 1, wherein the monitor has, leftward of the DPF condition display area, a second operation state display area to display a second operation state of the work vehicle and, rightward of the DPF condition display area, a third operation state display area to display a third operation state of the work vehicle.

* * * * *